United States Patent [19]

Hills

[11] 3,873,496

[45] Mar. 25, 1975

[54] FLAME-RETARDANT POLYESTER COMPOSITIONS

[75] Inventor: William A. Hills, Trenton, N.J.

[73] Assignee: FMC Corporation, New York, N.Y.

[22] Filed: June 11, 1973

[21] Appl. No.: 368,738

[52] U.S. Cl. ........ 260/45.8 R, 260/41 A, 260/41 B, 264/211, 264/176 F
[51] Int. Cl. ............................................. C08f 45/60
[58] Field of Search .............................. 260/45.8 R

[56] References Cited
UNITED STATES PATENTS

| | | |
|---|---|---|
| 3,293,327 | 12/1966 | Hechenbleikner et al... 260/45.75 R |
| 3,737,485 | 6/1973 | Hechenbleikner ............ 260/45.8 R |

*Primary Examiner*—Melvyn I. Marquis

[57] ABSTRACT

Flame-retardant polyester compositions which contain 5 to 25 percent of a hydroxymethyl bicyclic phosphate compound as a flame-retardant additive.

8 Claims, No Drawings

FLAME-RETARDANT POLYESTER COMPOSITIONS

This invention relates to flame-retardant polyester compositions. More particularly, the invention relates to flame-retardant polyester fibres, films and molded articles wherein the flame-retardant additive is a certain bicyclic phosphate compound.

Polyester compositions containing organic phosphorus and organic halogen compounds are known and are disclosed, for example, in U.S. Pat. Nos. 3,356,631 issued Dec. 5, 1971, to Jackson et al; 3,645,962 issued Feb. 29, 1972, to Schwarz; 3,681,281 issued Aug. 1, 1972, to Juelke et al; 3,688,001 issued Aug. 29, 1972 to Exner et al.; 3,708,328 issued Jan. 2, 1973, to Kelkheim et al, and West German Pat. No. 2,001,125 (1970) to Caldwell et al (Eastman Kodak Company). The aforesaid patents deal with methods and additives for imparting flame retardance to polyesters. Bicyclic derivatives of phosphorus are known and are described in U.S. Pat. No. 3,293,327 issued Dec. 20, 1966, to Hechenbleikner et al.

However, it has always been desirable to provide more efficient flame retardants which are thermally stable and which can be incorportated into molten polyester prior to formation of fibers, films or molded articles.

According to the present invention, there have been discovered flame-retardant polyester compositions comprising a linear polyester and 4-hydroxymethyl-1-oxo-2,6,7-trioxal-1-phosphabicyclo[2.2.2]octane as the flame-retardant additive in an amount of from 5 to 25 percent by weight, based on the combined weight of polyester and additive.

The flame-retardant additive of the present invention may be represented by the formula:

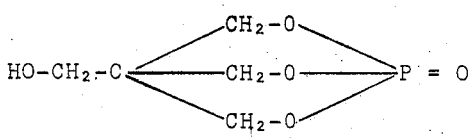

and is readily prepared using conventional techniques as disclosed, for example, in U.S. Pat. No. 3,293,327 referred to above.

Broadly speaking the present invention comprises polyester fibers, films and molded articles containing from about 5 to 25 percent by weight, based on the combined weight of polyester and flame retardant, of the aforesaid bicyclic phosphate flame-retardant additive.

The polyesters which are rendered flame-retardant in accordance with the present invention include both the fiber- and film-forming linear saturated polyesters derived from saturated aliphatic and aromatic dicarboxylic acids and saturated diols as well as linear unsaturated polyesters which are principally employed for casting and molding applications.

The fiber- and film-forming saturated polyesters are prepared from dicarboxylic acids such as terephthalic acid, isophthalic acid, adipic acid, diphenyl4,4'-dicarboxylic acid (bi-benzoic aicd), 4,4'-di-(carboxyphenyl)methane, 2,6-naphthalene-dicarboxylic acid, 1,3-cyclopentanedicarboxylic acid, 1,3-cyclohexanedicarboxylic acid and the like. Diols generally employed to prepare the fiber- and film-forming polyesters are the saturated aliphatic, saturated cycloaliphatic or aromatic diols, prefreably the lower alkane diols such as ethylene glycol, propylene glycol and butylene glycol. Other exemplary diols include ethylene diglycol, dimethylolcyclohexane, 1,6-hexanediol, p-xylylenediol and the like. Particularly preferred are fiber- and film-forming polyesters prepared from ethylene glycol and terephthalic acid. These fiber- and film-forming polyesters generally have an average molecular weight of at least about 10,000.

Unsaturated polyesters are characterized in that they are based on macromolecules with a polyester backbone in which both a saturated acid, e.g., phthalic, isophthalic or adipic acid, and an unsaturated acid such as maleic or fumaric acid are condensed with a diol. A three dimensional structure is obtained by cross-linking the linear polyester backbone through the unsaturated acid component with a vinyl monomer, which is usually styrene. Conventional peroxide initiators are employed, such as benzoyl peroxide or cumene hydroperoxide. The cross-linking monomers also may act as solvents for the polyester so as to produce a liquid, low viscosity polyester-monomer system which is useful for casting and molding applications. Before addition of the vinyl monomer, the polyester backbone usually has a molecular weight of about 1,000 to 5,000.

A particularly preferred embodiment of the present invention resides in providing flame-retardant spun polyester fibers such as polyethylene terephthalate, poly(1,4-cyclohexylenedimethylene)terephthalate or polyethylene 2,6-naphthalenedicarboxylate spun fibers having significantly improved flame-retardant characteristics.

As is known in the art, polyester fibers are conventionally prepared by the so-called melt spinning technique. In this method, the molten polyester is extruded under pressure through a spinneret plate having a plurality of small circular openings about 0.009 inch in diameter. The spinning is carried out at a temperature of from about 260° to 300°C for polyethylene terephthalate fibers. The polymeric polyester has been previously prepared either by the batch method or by the continuous polymerization technique.

Thus, in view of the conditions employed in the melt spinning process, there are significant number of problems to be overcome in successfully incorporating an effective flame retardant during melt spinning. The flame retardant must be thermally stable, it must be both unreactive with and soluble in the molten polyester. In addition, the flame retardant must have a low volatility at spinning temperatures and should not in any way interfere with the operation of the spinneret. The flame retardant should also have no substantial adverse effect upon the physical properties of the spun fiber.

The bicyclic phosphate flame-retardant additive of the present invention meets all these important criteria and is particularly suitable for use in connection with the melt spinning process for producing polyester fibers.

Generally speaking, from about 5 to 25 percent of the flame-retardant additive is employed based on the combined weight of polyester and additive, i.e., 5 to 25 parts by weight of flame retardant and 95 to 75 parts by weight of polyester. Preferably, about 10 to 15 percent by weight of flame-retardant additive is employed.

Flame-retardant polyester fibers prepared in accordance with the present invention may be used as such, or may be blended with other fibrous materials such as cotton, rayon, nylon, acetate, acrylics and the like, and such blends are well known to those in the textile art.

Polyesters useful for molding compositions will generally contain inorganic reinforcing fillers such as mineral silicates, silica gel, asbestors, clay, talc, and the like which improve the physical properties of the molding compounds, with glass fibers being a preferred reinforcing additive for such compositions at concentrations of about 10 to 50 percent by weight of the total molding composition.

Of course, flame-retardant polyester fibers, films and molded articles prepared in accordance with the present invention may contain wide variety of additional ingredients such as plasticizers, dyes, heat and color stabilizers, pigments, antioxidants, antistatic agents and various other special purpose additives employed in the processing of polyester compositions.

The invention is further illustrated by the following examples which are not to be considered as limitative of its scope. All parts and percentages are by weight based on the total weight of the composition and temperatures are in degrees centigrade, unless otherwise stated.

EXAMPLE I

To a stirred solution of 26.4 g of 4-hydroxymethyl-2,6,7-trioxa-1-phosphabicyclo[2.2.2]octane (prepared according to J.A.C.S. 84, 610 (1972) in 110 ml of isopropanol was added dropwise a solution of 11.4 g. of 30 percent hydrogen peroxide in 20 ml of isopropanol. The reaction was exothermic and an ice bath was used to maintain the temperature at 25°–30°C during the addition. After the addition was completed, the reaction mixture was allowed to warm up to room temperature and was then stirred for 1 hour. The propanol was removed by evaporation and 18.1 g of colorless crystals was recrystallized from ethanol and the product was identified as 4-hydroxymethyl-1-oxo-2,6,7-trioxa-1-phosphabicyclo[2.2.2]octane.

| Elemental Analyses for Carbon and Hydrogen: | | |
|---|---|---|
| Theory: | 33.33%C; | 5.00%H |
| Found: | 33.38%C; | 4.87%H |

EXAMPLE II

The flame retardancies of polyethylene terephthalate (PET) placques containing the compound prepared in Example I were determined by measuring the Limiting Oxygen Index (LOI) of the plaques.

The plaques were first prepared as follows:

One brass plate (6 inches × 6 inches chrome plated) is placed on the bottom (chrome side up), a 6 inches × 6 inches × ¼ inch spacer 1/32 inch stainless steel) is placed on a 6-½ inches × 6-½ inches sheet of aluminum foil and the edges are folded over and pressed into place. This is then placed on the brass plate. A 6 gram, 1-mesh screened sample of ground polymer (containing the flame-retardant additive) is spread evenly on the foil in the 5-½ inches × 5-½ inches square framed by the spacer. A glass fiber fabric (5-½ inches × 5-½ inches) is placed over the polymer. A second 6 gram portion of the polymer-additive composition is spread evenly over the fiberglass fabric. A 6 inches × 6 inches sheet of aluminum foil is placed over the polymer and a second chrome plated brass plate is put on top (chrome side in). The mold assembly is placed in a hydraulic press previously heated to 275°C, the plates are closed gentaly to allow melting (about 3 minutes), and then the pressure is increased rapidly to 10,000–12,000 lbs. After 1 minute the pressure is released and the mold quenched in a cold water bath. The foil is removed and the composite cut out. The 5-½ inches square plastic composite of PET resin and glass fabric is cut into 3½ inches × ½ inch strips which are dried at 100°C for 1 hour.

The LOI test is made by supporting the 3-½ inches × ½ inch sample strip in a U-shaped frame which is mounted in a cylindrical open chamber. Controlled mixtures of oxygen and nitrogen gases are admitted into the base of the chamber and allowed to displace the normal atmosphere. When an equilibrium atmosphere in the chamber is obtained, the sample is ignited with a butane gas flame by contacting the flame with the top edge of the sample. If the sample fails to ignite, the oxygen ratio of the atmosphere is increased to a level where the flame will just propagate. Conversely, if the sample strip ignites and the flame propagates, the oxygen ratio of the atmosphere is reduced to a level where flame propagation is virtually zero. The LOI is the minimum percentage concentration of the oxygen atmosphere in which the test sample will ignite and permit flame propagation.

The LOI test was introduced in 1966 (Fennimore et al, Modern Plastics, 43, 141 (1966) and is the basis for ASTM-D-2863-70. The apparatus used was the Oxygen Index Flammability Tester (Model JD14) manufactured by MKM Machine Tool Co., Inc.

The LOI results for PET plaques containing various amounts of the additive prepared in Example I are set forth in the table below:

Table I

| Sample | Flammability Data | |
|---|---|---|
| | % Additive of Example I | LOI |
| 1 | None | 21.0 |
| 2* | 11.7% | 29.0 |
| 3* | 11.7% | 29.5 |

*In sample 2 the polyester and additive were physically ground together before preparing the plaque; in sample 3, the polyester was mix-melted with the additive before making the plaque, which demonstrates the compatibility of the materials.

EXAMPLE III

A melt mixture of polyethylene terephthalate (90 parts) and the flame-retardant additvie of Example I (10 parts) was prepared and spun at 280°C in a laboratory fiber spinning apparatus. Flame-retardant fibers of acceptable intrinsic viscosity and fiber tenacity were formed, demonstrating the stability of the blend and its fiber-forming characteristics.

What is claimed is:

1. A flame-retardant polyester composition comprising a linear polyester and from 5 to 25 percent by weight of 4-hydroxymethyl-1-oxo-2,6,7-trioxa-1-phosphabicyclo[2.2.2]octane as the flame-retardant additive based on the combined weight of polyester and additive.

2. The composition of claim 1 where there is present 10 to 15 percent of said flame-retardant additive.

3. The composition of claim 1 wherein said polyester is a fiber-forming polyester.

4. The composition of claim 3 wherein said polyester is selected from the group consisting of polyethylene terephthalate, polyethylene 2,6-naphthalene dicarboxylate and poly-1,4-cyclohexylenedimethylene terephthalate.

5. A fiber formed from the composition of claim 1.

6. A film formed from the composition of claim 1.

7. A molded article formed from the composition of claim 1.

8. The composition of claim 4 in the form of a fiber.

* * * * *